United States Patent [19]

[11] 4,253,961

Schlebusch et al.

[45] Mar. 3, 1981

[54] VIBRATORY CENTRIFUGE FOR THE DEWATERING OF COAL SLUDGE

[75] Inventors: Ludwig Schlebusch, Mülheim; Herbert Schiele, Kettwig, both of Fed. Rep. of Germany

[73] Assignee: Siebtechnik GmbH, Fed. Rep. of Germany

[21] Appl. No.: 110,535

[22] Filed: Jan. 8, 1980

Related U.S. Application Data

[63] Continuation of Ser. No. 946,534, Sep. 28, 1978, abandoned.

[30] Foreign Application Priority Data

Oct. 28, 1977 [DE] Fed. Rep. of Germany ... 7733219[U]

[51] Int. Cl.[3] .............................................. B01D 33/06

[52] U.S. Cl. .................................................. 210/380.3

[58] Field of Search ............... 210/380 H, 360 R, 369; 209/270, 287

[56] References Cited

U.S. PATENT DOCUMENTS

| | | | |
|---|---|---|---|
| 2,755,934 | 7/1956 | Ruegg | 210/380 H X |
| 3,133,879 | 5/1964 | Becker et al. | 210/380 H X |

FOREIGN PATENT DOCUMENTS

| | | | |
|---|---|---|---|
| 536757 | 4/1955 | Belgium | 210/380 |
| 1198211 | 12/1959 | France | 210/380 |

*Primary Examiner*—William A. Cuchlinski, Jr.
*Attorney, Agent, or Firm*—Reed, Smith, Shaw & McClay

[57] ABSTRACT

A vibratory centrifuge for the dewatering of coal sludge, washed small coal or slack which comprises a revolvable conical screen which has a diameter that increases towards its discharge end. The conical screen is vibratable in an axial direction and includes radial steps each having a height of at least 20 mm to rearrangement or loosen the material in the zone of each step.

6 Claims, 1 Drawing Figure

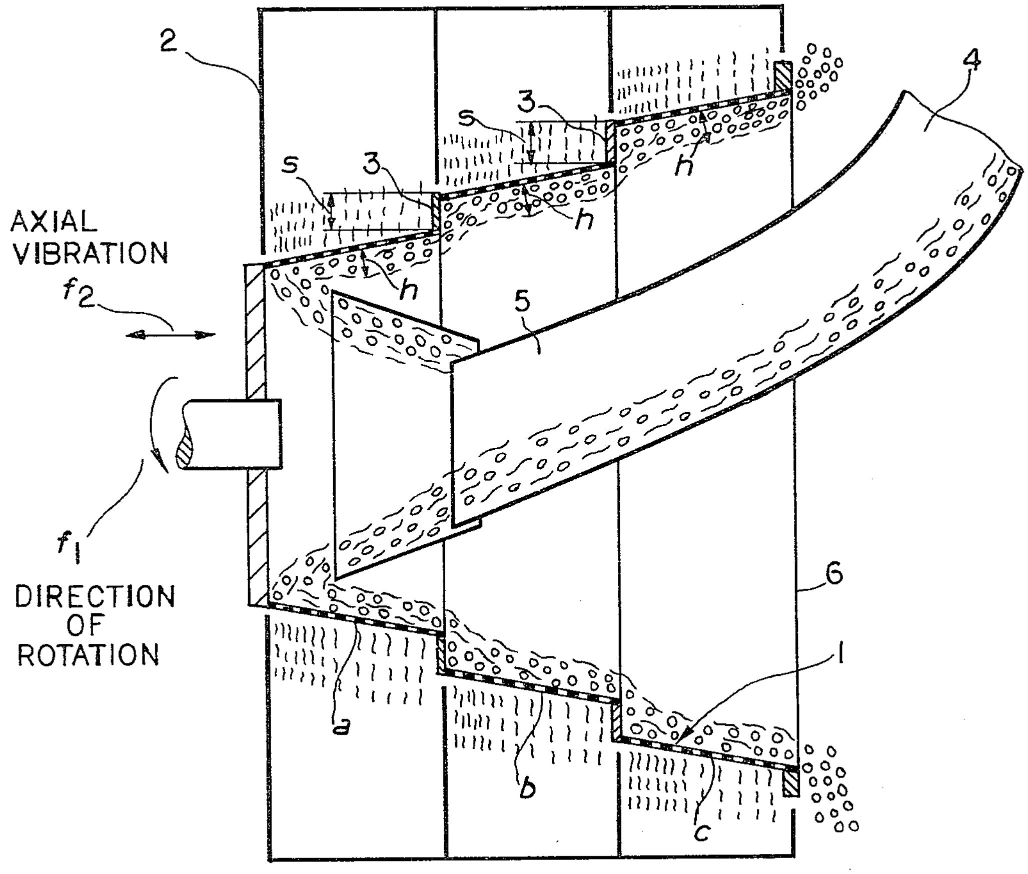
s= STEP HEIGHT
h =HEIGHT OF MATERIAL DEPOSIT BELOW STEP

VIBRATORY CENTRIFUGE FOR THE DEWATERING OF COAL SLUDGE

This is a continuation of application Ser. No. 946,534 filed 9/28/78 now abandoned.

FIELD OF THE INVENTION

The invention relates to vibratory centrifuges for dewatering coal sludge, washed small coal or slack, and in particular to a revolvable, vibratory conical screen centrifuges.

BACKGROUND OF THE INVENTION

In dewatering small coal or slack the deposit which settles on the dewatering screen offers considerable resistance to the passage of water. Also, the dewatering process becomes increasingly slower and more difficult with increasingly finer grain sizes of the processed material.

One method which had been used to increase the amount of liquid abstracted from fines comprised a revolving screen having steps located in one or several lateral planes or radial planes. The steps were to cause a loosening or rearrangement of the layers of material being dewatered as it moved to the discharge end and thereby reduce the resistance against dewatering. Initial concepts of this kind were, for example, disclosed in German Patent No. 378,453. Similar concepts were disclosed also in German Patent Nos. 945,317 and 1,157,551.

Notwithstanding the fact that the concept of stepping the revolving screen in non-vibratory centrifuges was well recognized, centrifuges incorporating the concept failed to achieve practical acceptance, and in German Patent No. 1,782,196 (representing an addition to German Patent No. 1,157,551) it was suggested that stepping should be specifically omitted in order to reduce the wear of the revolving screen. Accordingly, those skilled in the art have rejected the concept of stepping the revolving screens vibratory centrifuges as being impractical or non-beneficial in that the sought after improvements in liquid abstraction did not come about. Vibratory centrifuges having stepped revolving screens are apparently no longer used or offered for sale.

An object of the present invention is to provide a form of vibratory centrifuge having stepped revolving screens which ensure better liquid abstraction than can be obtained with vibratory centrifuges known in the prior art.

SUMMARY OF THE INVENTION

The present invention overcomes the limitations and problems with prior art dewatering centrifuges. Generally, the vibratory centrifuge of the present invention comprises a revolvable conical screen which widens (or is of increasing diameter) towards its discharge end. The conical screen is adapted for vibration in the axial direction and is stepped in at least one radial plane wherein the height of each step is at least 20 mm. Only by so dimensioning each step is there an adequate rearrangement or loosening of the material in the zone of the step so that the cohesion of the deposits is adequately loosened to allow the various water particles to reach and pass through the dewatering surface more easily and without hindrance.

The discharge action due to centrifugal force is assisted by the oscillation or vibration of the revolving screen in that the vibration or oscillation component directed parallel to the revolving screen is superimposed on the forward feeding component of the centrifugal force, as a result of which even the discharge of viscous centrifugal material with angles of repose on the screen larger than the angle of slope of the latter is ensured.

Preferably, step height s is, as a function of the depth h of a deposit building up inside the revolving screen, is on the order of magnitude of $s/h \approx 1$ to 3. For an anticipated depth of deposit of about 30 mm, a step height of about 40 mm can bring about successful dewatering.

By using such a ratio, it has been found that improvements in dewatering of from 1 to 1.5% have been achieved. Such a reduction is of significant importance in the field of dewatering coal sludge or coal fines. Other advantages of the invention will become apparent from a perusal of the following detailed description of the invention taken in connection with the accompanying drawing.

DESCRIPTION OF THE DRAWING

The drawing is a diagrammatic sectional elevation of a vibratory centrifuge with a stepped revolving screen in accordance with the present invention.

DESCRIPTION OF THE INVENTION

Referring to the drawing, there is located inside centrifuge casing 2 a revolving conical screen 1 which is rotatably driven in the direction indicated at $f_1$ and vibrates axially in the direction indicated by $f_2$. Screen 1 is of conical configuration which widens or is of increasing diameter towards its discharge end 6. Material to be dewatered is supplied through charging pipe 4 which preferably includes a distributing funnel 5. Revolving screen 1 substantially comprises three truncated-cone shaped separate sections a, b and c which are joined with one another through radially directed steps 3 so as collectively to provide a stepped revolving screen. The step height s is at least 20 mm and preferably varies as between each section depending upon the deposit depth h of the individual material layers deposited in the associated revolving screen sections a, b and c. The usual depth of deposited layers encountered in coal dewatering is between 20–60 mm, and the ratio of the step height s to the depth h of layer of material below the step is preferably on order of magnitude of $s/h \approx 1$ to 3. A step height of about 40 mm has for example been found successful for a deposited layer depth. Preferably, the revolvable screen 1 is the form of a frustum of a right circular cone.

In practice a vibratory centrifuge in accordance with the present invention it is possible to achieve for small coal or slack with a particle size distribution of 10–0.5 mm, for example, and an initial moisture content of 20–30% to obtain a final moisture content of between 6–8.5%. This compares to a final moisture content of about 7 to 10% with prior art devices. A reduction in the final moisture content by only about 1.0–1.5% has to be regarded as a major benefit in the field of dewatering of coal sludge or small coal or slack with which we are concerned here.

While a presently preferred embodiment of the invention has been shown and described, it may be otherwise embodied within the scope of the appended claims.

What is claimed is:

1. A vibratory centrifuge for the dewatering of coal sludge, washed small coal or slack to provide a cake of a substantial deposit depth, comprising a revolvable conical screen adapted to have deposited thereon a layer of said sludge, coal or slack for dewatering and having a diameter which increases towards its discharge end, said screen being adapted to vibrate in its axial direction and being stepped in at least one radial plane, each of said steps being at least 20 mm in height and wherein the ratio of step height to deposit depth is from 1 to 3.

2. A vibratory centrifuge as set forth in claim 1 wherein the screen has a plurality of axially-spaced steps each in a radial plane and of a height of at least 20 mm.

3. A vibratory centrifuge as set forth in claim 1 wherein said step height is about 40 mm for each 30 mm of deposit layer depth.

4. A vibratory centrifuge having a revolvable screen as set forth in claim 1, the improvement therein comprising:

at least one step in the radial plane of said screen, said step having a height of at least 20 mm and said screen being in the form of a frustum of a right circular cone.

5. The vibratory centrifuge of claim 1 wherein the portions of said conical screen on opposite sides of said steps are in parallel cones.

6. A conical screen for use in a vibratory centrifuge for dewatering coal, the diameter of said screen increasing towards the discharge end thereof and being adapted to vibrate in the axial direction, wherein the improvement comprises:

at least one step in the radial plane of said screen such that the ratio of the minimum height(s) of the step to the nominal diameter (D) of the screen is obtainable from a system of coordinates the ordinate of which represents the ratio s/D and the abscissa of which represents the ratio (D/Do) between the nominal diameter and a normalizing diameter (Do=1000 m.m.) wherein the minimum value of said ratio (s/D) is represented by a line passing through the s/D, D/Do coordinates of (2.22,0.9) and (1.18,1.7).

* * * * *